(12) United States Patent
Thubert et al.

(10) Patent No.: US 9,015,852 B2
(45) Date of Patent: Apr. 21, 2015

(54) PROTECTING ADDRESS RESOLUTION PROTOCOL NEIGHBOR DISCOVERY CACHE AGAINST DENIAL OF SERVICE ATTACKS

(75) Inventors: Pascal Thubert, La Colle sur Loup (FR); Eric Levy-Abegnoli, Valbonne (FR); Vincent J. Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/459,818

(22) Filed: Apr. 30, 2012

(65) Prior Publication Data

US 2013/0291117 A1    Oct. 31, 2013

(51) Int. Cl.
G06F 7/04       (2006.01)
G06F 21/10     (2013.01)

(52) U.S. Cl.
CPC .................................... G06F 21/10 (2013.01)

(58) Field of Classification Search
CPC ....................................................... G06F 21/10
USPC ..................................................... 726/23–30
See application file for complete search history.

(56) References Cited

U.S. PATENT DOCUMENTS

| | | | |
|---|---|---|---|
| 7,411,957 B2 | 8/2008 | Stacy et al. | |
| 7,587,760 B1 | 9/2009 | Day | |
| 8,045,558 B2 | 10/2011 | Droms et al. | |
| 8,065,515 B2 | 11/2011 | Droms et al. | |
| 8,068,414 B2 | 11/2011 | Huegen et al. | |
| 8,085,686 B2 | 12/2011 | Thubert et al. | |
| 8,219,800 B2 | 7/2012 | Levy-Abegnoli et al. | |
| 8,266,427 B2 | 9/2012 | Thubert et al. | |
| 8,312,541 B2 | 11/2012 | Levy-Abegnoli et al. | |
| 2009/0024758 A1 | 1/2009 | Levy-Abegnoli et al. | |
| 2011/0317711 A1 | 12/2011 | Droms et al. | |
| 2012/0331542 A1* | 12/2012 | Halpern ......................... | 726/13 |

FOREIGN PATENT DOCUMENTS

WO    WO-2007056841 A1    5/2007

OTHER PUBLICATIONS

"IPv6 First Hop Security-Protecting Your IPv6 Access Network", Whitepaper No. C11-602135-00, Cisco Systems, Inc., May 2010, 6 pages.

(Continued)

*Primary Examiner* — Anthony Brown
(74) *Attorney, Agent, or Firm* — Parker Ibrahim & Berg LLC; James M. Behmke; Kenneth J. Heywood

(57) ABSTRACT

In one embodiment, a device (e.g., switch or registry) maintains a binding table for all internet protocol (IP) addresses in a particular subnet associated with the device, and in response to receiving a neighbor solicitation (NS) lookup message from a router for a particular address, determines whether the particular address is within the binding table. When the particular address is not within the binding table, the device causes the router to not store the particular address in a neighbor discovery (ND) cache at the router (e.g., by responding to clear the cache, or ignoring to prevent state from being created). In another embodiment, the ND-requesting router ensures that the particular address is not kept in an ND cache at the router in response to the device indicating that the particular address is not within its binding table (e.g., an explicit response to clear, or absence of instruction to store state).

16 Claims, 12 Drawing Sheets

(56) References Cited

OTHER PUBLICATIONS

Arkko, J., et al., "SEcure Neighbor Discovery", IETF Network Working Group, Request for Comments 3971, Mar. 2005, 57 pages.

Bagnulo, et al., "SEND-Based Source-Address Validation Implementation", draft-ietf-savi-send-06, IETF Internet Draft, Oct. 2011, 30 pages.

Bi, et al., "SAVI for Mixed Address Assignment Methods Scenario", draft-ietf-savi-mix-01, IETF Internet Draft, Oct. 2011, 9 pages.

Bi, et al., "SAVI Solution for DHCP", draft-ietf-savi-dhcp-11.txt, IETF Internet Draft, Dec. 2011, 27 pages.

McPherson, et al., "SAVI Threat Scope", draft-ietf-savi-threat-scope-05, IETF Internet Draft, Apr. 2011, 23 pages.

Narten, et al., "Neighbor Discovery for IP Version 6 (IPv6)", IETF Request for Comments 1970, Aug. 1996, 83 pages.

Narten, et al., "Neighbor Discovery for IP Version 6 (IPv6)", IETF Request for Comments 2461, Dec. 1998, 93 pages.

Narten, et al., "Neighbor Discovery for IP Version 6 (IPv6)", IETF Request for Comments 4861, Sep. 2007, 98 pages.

Nordmark, et al., "FCFS SAVI: First-Come First-Serve Source-Address Validation for Locally Assigned IPv6 Addresses", draft-ieft-savi-fcfs-10, IETF, Network Working Group, Nov. 2011, 33 pages.

Thomson, et al., "IPv6 Stateless Address Autoconfiguration", IETF Request for Comments 1971, Aug. 1996, 22 pages.

Thomson, et al., "IPv6 Stateless Address Autoconfiguration", IETF Request for Comments Dec. 1998, 26 pages.

Thomson, et al., "IPv6 Stateless Address Autoconfiguration", IETF Request for Comments 4862, Sep. 2007, 30 pages.

Wu, et al., "Source Address Validation Improvement Framework", draft-ietf-savi-framework-06, IETF Internet Draft, Dec. 2011, 16 pages.

Vinci, et al., "Notification of Transmittal of the International Search Report and The Written Opinion of the International Searching Authority, or the Declaration", Patent Cooperation Treaty, International Appl. No. PCT/US2013/038605, mailed Aug. 5, 2013, 13 pages, European Patent Office, Rijswijk, Netherlands.

\* cited by examiner though the illustrative description may refer to particular illustrative devices herein.

PROTECTING ADDRESS RESOLUTION PROTOCOL NEIGHBOR DISCOVERY CACHE AGAINST DENIAL OF SERVICE ATTACKS

TECHNICAL FIELD

The present disclosure relates generally to computer networks, and, more particularly, to address resolution protocol neighbor discovery (ARP/ND) in computer networks.

BACKGROUND

Switches are required to be more and more IPv6 aware in order to protect the network against rogue or uncontrolled behaviors, particularly in secure environments. For instance, IPv6 (Internet Protocol version 6) "first hop security" is a switch feature that protects the layer-2 (L2) network against misuse of IPv6 protocols such as the neighbor discovery protocol (NDP) and the dynamic host configuration protocol (DHCP).

One well-known attack is a scanning attack from the outside, where an attacker will send a packet to a large number of IPv6 addresses that are derived from a same subnet. Neighbor discovery (ND) requires that a receiving router creates an ND cache entry for each of these scanned addresses and keeps the entry for multiple seconds, which can result in a memory depletion in the router and limit the capability by the router to serve existing hosts in the subnet. This attack is a big concern in IPv6 (and exists in IPv4 as well) because of the size of the subnet (allowing the attacker to crate more state in the router) and because the router is expected to store packets that triggered the resolution.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device (e.g., switch or registry) maintains a binding table for all internet protocol (IP) addresses in a particular subnet associated with the device, and in response to receiving a neighbor solicitation (NS) lookup message from a router for a particular address, determines whether the particular address is within the binding table. When the particular address is not within the binding table, the device causes the router to not store the particular address in a neighbor discovery (ND) cache at the router (e.g., by responding to clear the cache, or by ignoring to prevent state from being created).

According to one or more additional embodiments of the disclosure, a router receives a message to a particular address within a particular subnet, and generates an NS lookup message for the particular address. By transmitting the NS lookup message toward a registry, a device with a binding table of all internet protocol (IP) addresses in the particular subnet is caused to determine whether the particular address is within the subnet. The router may thus ensure that the particular address is not kept in an ND cache at the router in response to the device indicating that the particular address is not within the binding table of the device (e.g., an explicit response to clear, or absence of instruction to store state).

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
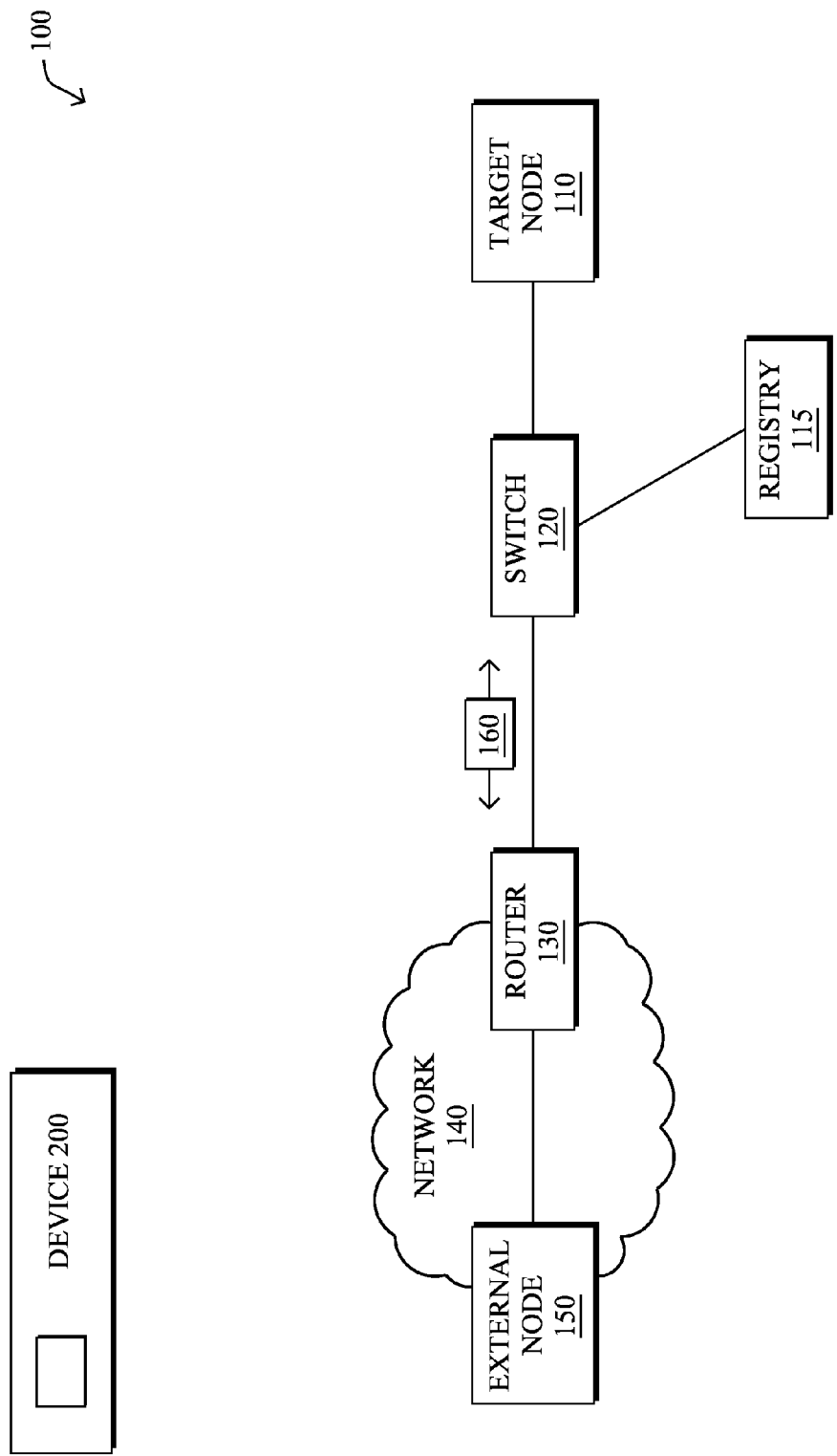
FIG. 1 illustrates an example communication network.

FIG. 1 is a schematic block diagram of an example computer network 100 illustratively comprising nodes/devices 200 such as one or more client devices (e.g., target node 110) interconnected via a switch 120 to a router 130 of a network (e.g., WAN) 140. Note that in certain embodiments, a registry device 115 may also be interconnected with the switch 120, as described herein. In addition, an external node 150 may be located outside of the target node's local network (e.g., between router 130 and target node 110). The links between devices may be wired links or shared media (e.g., wireless links, PLC links, etc.) where certain nodes 200 may be in communication with other nodes 200 (e.g., based on physical connection configuration) current operational status, distance, signal strength location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
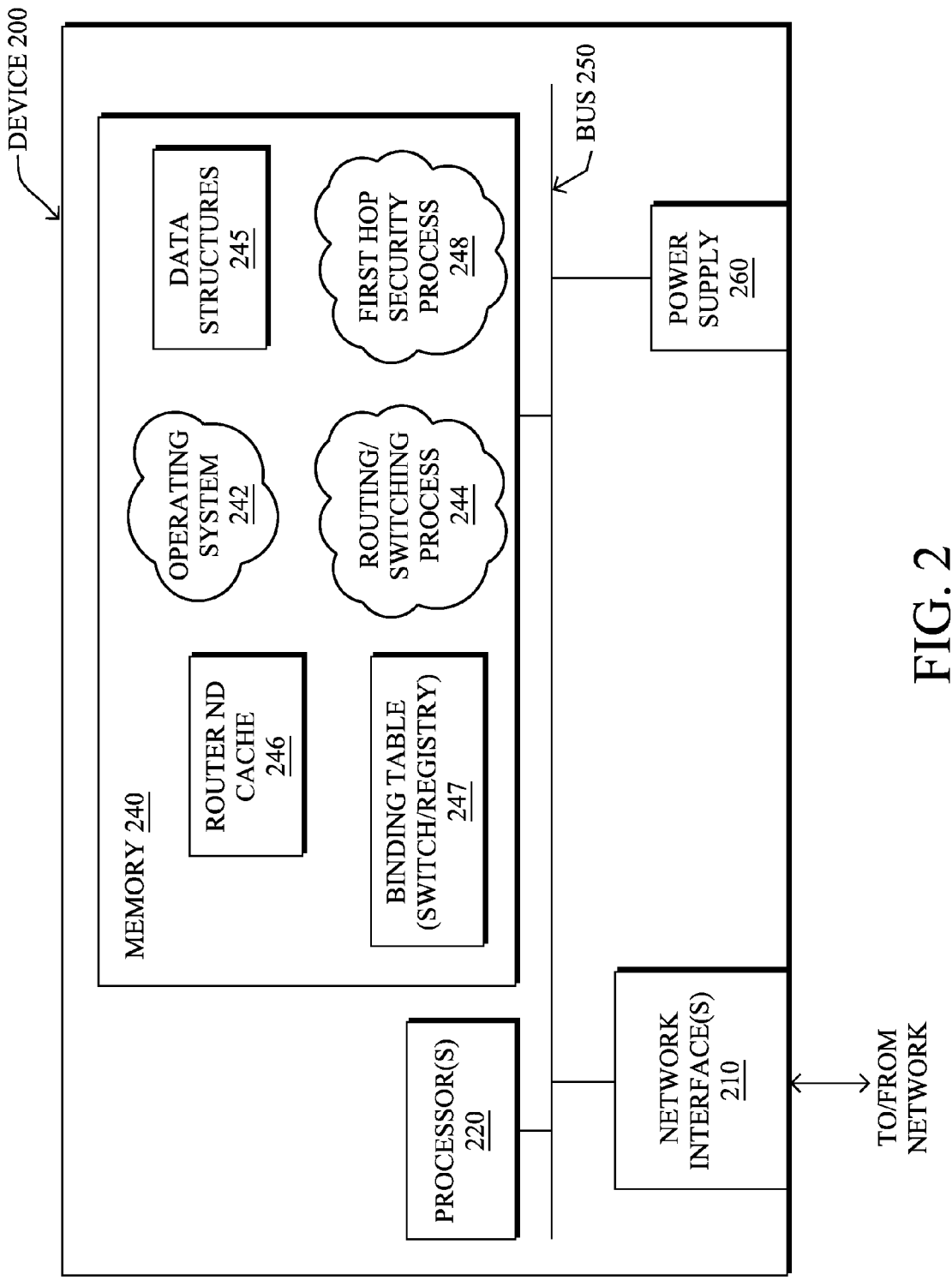
FIG. 2 illustrates an example network device/node.

FIG. 2 is a schematic block diagram of an example node/device 200 that may be used with one or more embodiments described herein, e.g., as any of the devices shown in FIG. 1 above, particularly a router, a switch, and/or a registry device 115, as described below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245, such as a router neighbor discovery (ND) cache 246 (on a router 130) or a binding table/registry 247 (on a switch 120 or registry 115, respectively). An operating system 242, portions of which are typically resident in memory 240 and executed by the processor, functionally organizes the device by, inter alia, invoking operations in support of software processes and/or services executing on the device. These software processes and/or services may comprise an illustrative routing/switching process 244 (e.g., for a router or switch, respectively), as well as an illustrative first hop security process 248. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, switches are required to be more and more IPv6 aware in order to protect the network against rogue or uncontrolled behaviors, particularly in secure environments. For instance, IPv6 (Internet Protocol version 6) "first hop security" is a switch feature that protects the layer-2 (L2) network against misuse of IPv6 protocols such as the neighbor discovery protocol (NDP) and the dynamic host configuration protocol (DHCP).

In particular, there are a growing number of large-scale IPv6 deployments at enterprise, university, and government networks. For the success of each of these networks, it is important that the IPv6 deployments are secure and are of a service quality that equals that of the existing IPv4 infrastructure. Network users generally have an expectation that there is functional parity between IPv4 and IPv6 and that on each of these protocols security and serviceability concerns are similar. From the network operator perspective there is a similar assumption that both IPv4 and IPv6 are secure environments with a high degree of traceability and quality assurance.

Threats are very much tied to the topology of a network infrastructure, and IPv6 brings in specific changes from a topology perspective:
  More end nodes allowed on the link (up to 264);
  Bigger neighbor cache on end nodes;
  Bigger neighbor cache on default router;
  These create more opportunities for denial-of-service (DoS) attacks;
In addition to the topological aspects there are threats closely related to the protocols in use:
  Neighbor Discovery Protocol (NDP) integrates all link operations in charge of determining address assignment, router discovery, and associated tasks like redirect.
  Dynamic Host Configuration Protocol (DHCP) has a smaller role in address assignment compared to IPv4.
  Non-centralized address assignment creates true challenges for controlling address misusage.

Due to the uptake in IPv6 technology and the intrinsic differences between IPv4 and IPv6 outlined above, it is very important to have both a secure IPv4 environment and a secure IPv6 environment. When analyzing where best to secure the link operations, these can be divided into three different locations within the network. Security enforcement can happen at the end nodes (target node 110), at the first hop within the network (switch 120), and at the last hop (router 130).

When performing security at the end node, a distributed model provides for end nodes that take care of themselves, and does not provide any link operation with bottlenecks or single points of failure. This security model does not need central administration or operation as it is assumed that each node takes care of itself. The ultimate level of security in this model is accomplished by a SeND (RFC 3971) deployment. This model is especially good for threats coming directly from the link; however, it provides poor protection against threats from offlink devices. Another consideration for this model is that, due to its distributed nature, a degree of complexity and heavy provisioning of end nodes is involved that spreads over the complete networking domain that is being secured.

The model for security at the first hop switch is based upon a centralized model run by a centralized security administration. The burden of security enforcement of the previous model is pushed toward the first hop device, making this model a better scalable model as fewer devices are affected by the security tasks involved. This model makes the transition from a non-secure link operation to a secure network easier as fewer components will have to be touched, monitored, and reconfigured. While this model is a very convenient model for the network operator and the actual end user, it is generally applicable in certain topologies in which all end users go through a network operator aggregation device capable of securing the link operations. This model increases the intelligence and the awareness that first hop networking devices need to have about the actual end nodes attached.

For security at the last router, a centralized model secures against threats coming from outside of the link that is being protected. A property of this model is that the attached link is protected as well as all the downstream network elements. This model has generally been combined with the first hop switch model to defeat threats that come from inside when, for example, a device has been compromised and is affecting the Internet network infrastructure. It requires the last hop router to learn about end nodes.

In comparison with IPv4, IPv6 has an increased set of capabilities to simplify end-system autoconfiguration while at the same time running service detection by means of Internet Control Message Protocol Version 6 (ICMPv6). One of the new functionalities within ICMPv6 is the Neighbor Discovery Protocol (NDP), which is an application and operates above ICMPv6. NDP makes heavy usage of multicast packets for on-the-wire efficiency. The functional applications of NDP include:

Router discovery;

Autoconfiguration of addresses, e.g., stateless address autoconfiguration (SLAAC)

IPv6 address resolution, e.g., replacing Address Resolution Protocol (ARP) (note that the acronym ARP herein may simply refer to both IPv6 address resolution and the Address Resolution Protocol);

Neighbor reachability, e.g., neighbor unreachability detection (NUD);

Duplicate address detection (DAD); and

Redirection;

The Secure Neighbor Discovery (SeND) (RFC 3971) is a protocol that enhances NDP with three additional capabilities:

Address ownership proof, which makes stealing IPv6 addresses "impossible," is used in router discovery, DAD, and address resolution, and is based upon Cryptographically Generated Addresses (CGAs). Alternatively, it also provides non-CGAs with certificates.

Message protection, which includes message integrity protection, replay protection, and request/response correlation, and is used in all NDP messages.

Router authorization, which authorizes routers to act as default gateways, and specifies prefixes that routers are authorized to announce "on-link."

While SeND provides a significant uplift to the IPv6 neighbor discovery technology by introducing the above enhancements, it does not, for example, provide any end-to-end security and provides no confidentiality.

The first hop for an end node is very often a Layer-2 switch. By implementing security features, the first hop switch may alleviate many of the caveats of a SeND deployment and increase the link security model. The first hop switch is strategically located to learn about all its neighbors, and hence the switch can easily either allow or deny certain types of traffic, end-node roles, and claims. In its central position, the first hop switch can fulfill a number of functions. It can inspect neighbor discovery (ND) traffic and provide information about Layer 2/Layer 3 (L2/L3) binding and monitor the use of ND by host to spot potentially abnormal behaviors. Ultimately, the switch can block undesired traffic such as rogue Router Advertisement (RA), rogue DHCP server advertisement, and data traffic coming from undesired IP addresses or prefixes.

One well-known attack, however, particularly against the first hop security model, is a scanning attack from the outside, where an attacker (e.g., external node 150) will send a packet to a large number of IPv6 addresses that are derived from a same subnet. Neighbor discovery (ND) requires that a receiving router 130 creates an entry in its ND cache 246 for each of these scanned addresses, and keeps the entry for multiple seconds, which can result in a memory depletion in the router and limit the capability by the router to serve existing hosts in the subnet. This attack is a big concern in IPv6 (and exists in IPv4 as well) because of the size of the subnet (allowing the attacker to crate more state in the router) and because the router is expected to store packets that triggered the resolution.

The Source Address Validation Improvements (SAVI) Working Group at the Internet Engineering Task Force (IETF) has been studying implementations for first hop security, however, no efficient solution to the above attack has been yet presented.

The following references, which are drafts available from the IETF and are each incorporated by reference in their entirety herein, are examples of current SAVI protocols:

"SAVI Solution for DHCP"<draft-ietf-savi-dhcp-11>, by J. Bi et al. (Dec. 28, 2011 edition);

"FCFS SAVI: First-Come First-Serve Source-Address Validation for Locally Assigned IPv6 Addresses"<draft-ietf-savi-fcfs> by Erik Nordmark et al. (Nov. 22, 2011 edition);

"Source Address Validation Improvement Framework"<draft-ietf-savi-framework> by Jianping Wu, et al. (Dec. 27, 2011 edition);

"SAVI for Mixed Address Assignment Methods Scenario"<draft-ietf-savi-mix> by Jun Bi et al. (Oct. 26, 2011 edition);

"SEND-based Source-Address Validation Implementation"<draft-ietf-savi-send> by Marcelo Bagnulo, et al. (Oct. 4, 2011 edition); and "SAVI Threat Scope"<draft-ietf-savi-threat-scope> by Danny McPherson, et al. (Apr. 11, 2011 edition).

Note in addition that the following Request for Comment (RFC) documents relating to IPv6 are also incorporated by reference in their entirety:

RFC 4861, "Neighbor Discovery for IP version 6 (IPv6)" by T. Narten, et al. (September 2007 edition, obsoleting RFCs 2461 and 1970); and RFC 4862, "IPv6 Stateless Address Autoconfiguration" by S. Thomson, et al. (September 2007 edition, obsoleting RFCs 2462 and 1971).

According to one or more embodiments of the disclosure, the techniques herein provide protection against DoS attacks for the ARP/ND cache 246 in routers 130. In particular, a switch (e.g., 120) or an L3 registrar (e.g., 115) maintains a binding table 247 for all the addresses (e.g., IPv6 addresses) in the subnet. When the router issues an ND lookup, it may be answered immediately with a negative status if the address is not known in the network, allowing the router to "clean up" the cache immediately. Alternatively, in another embodiment, the router stores no state for the associated address until it is a confirmed address.

Illustratively, the techniques described herein may be performed by hardware, software, and/or firmware, such as in accordance with the illustrative first hop security process 248, which may each contain computer executable instructions executed by the processor 220 to perform functions relating to the techniques described herein, e.g., in conjunction with routing/switching process 244. For example, the techniques herein may be treated as extensions to conventional first hop security protocols, and as such, may be processed by similar components understood in the art that execute those protocols on the specific device (e.g., router 140, switch 120, or even registrar 115) performing the action being described, accordingly.

Operationally, conventional NS/NA (neighbor solicitation/neighbor advertisement) messages may be modified (e.g., a new option) to allow the router 130 to query the network whether an address (e.g., IPv6) exists in the network or not. This option may typically be directed toward an L3 registry 115, but may also be intercepted by a switch 120 that maintains a binding table 247 for all IP addresses in a particular subnet associated with the switch/registry. That is, in response to receiving a message at a router 130 to a particular address within a particular subnet, the router generates a neighbor solicitation (NS) lookup message for the particular address, and transmits it toward a registry to cause either the registry or an intercepting switch to determine whether the particular address is within the subset. Typically the NS message with the new option may be sent to a Binding registrar (or registry) 115 as known by an anycast address, or else a service lookup, a configuration obtained through DHCP or authentication, authorization and accounting (AAA) servers, etc. When a switch 120 intercepts (receives) the message, it will act as a cache that may decide to respond on behalf of the registry by determining whether the particular address is within the binding table. Note that the switch may also revalidate the particular address with the registry prior to responding to the router.

The registry or the switch can respond immediately if the address is not present in the network (subnet), so the router can clean up the invalid ND cache entry within milliseconds. That is, if not within the binding table, the registry or switch can cause the router to not store (e.g., no longer store) the particular address in an ND cache at the router. By allowing a router to ensure that a particular address is not kept in an ND cache 246 in response the particular address not being within the binding table 247, the techniques close the window of lifetime (up to a few ms) of an INCOMPLETE entry in the ND cache 246 (three seconds by default, without the techniques herein). In this manner, the techniques herein greatly limit the amount (N) of INCOMPLETE cache entries that an attacker would be able to force into the router's ND cache (N=window×rate, where rate is the number of packets the attacker can generate per second).

Note further that there is also the case where the bindings are distributed amongst switches. That is, a set of switches can be seen as a virtual registry, where ND/NS DAD messages (multicast to the group of all other switches in the virtual registry) may be used to lookup an entry within the virtual registry. (Generally, the requesting switch may implement a short timer to account for any lack of response.) Alternatively, a diffusion algorithm (e.g., as used in the Diffusing Update ALgorithm (DUAL) in the Enhanced Interior Gateway Routing Protocol (EIGRP)), may be used to ensure that all other switches in the virtual registry received an inquiry about a new address, and that all have answered even if they do not have an entry for that new address.

An illustrative refinement to the techniques herein is to allow the router to ensure that the particular address is not kept in an ND cache by not creating any state before receiving a positive response relayed by the switch. Initially, the router may simply originate an NS for a particular address, and forget about it. This NS may illustratively contain a cookie (e.g., using a NONCE option) that the router can verify on the return path, such as a hash algorithm of a key+time, etc. Note that two cases thus arise: First, if the switch does not have the entry in the binding table, it does not respond to the router with any status, and the simply does not store the particular address in the ND cache prior to receiving an address validation from the device. As such, the attack window becomes window=0. Alternatively, if the entry is in the binding table, the NS is propagated in unicast to the address owner, who will respond with NA+NONCE and when the response reaches the router, after the NONCE validation, the router may then create an entry in the REACHABLE state. (Note that in a virtual registry that has a distributed binding table, where upon a local lookup miss, the NS may be passed to the other switches that participate to the virtual registry.)

The results of the techniques herein may be better understood with reference to the example message exchange diagrams described below.

Figure 3:
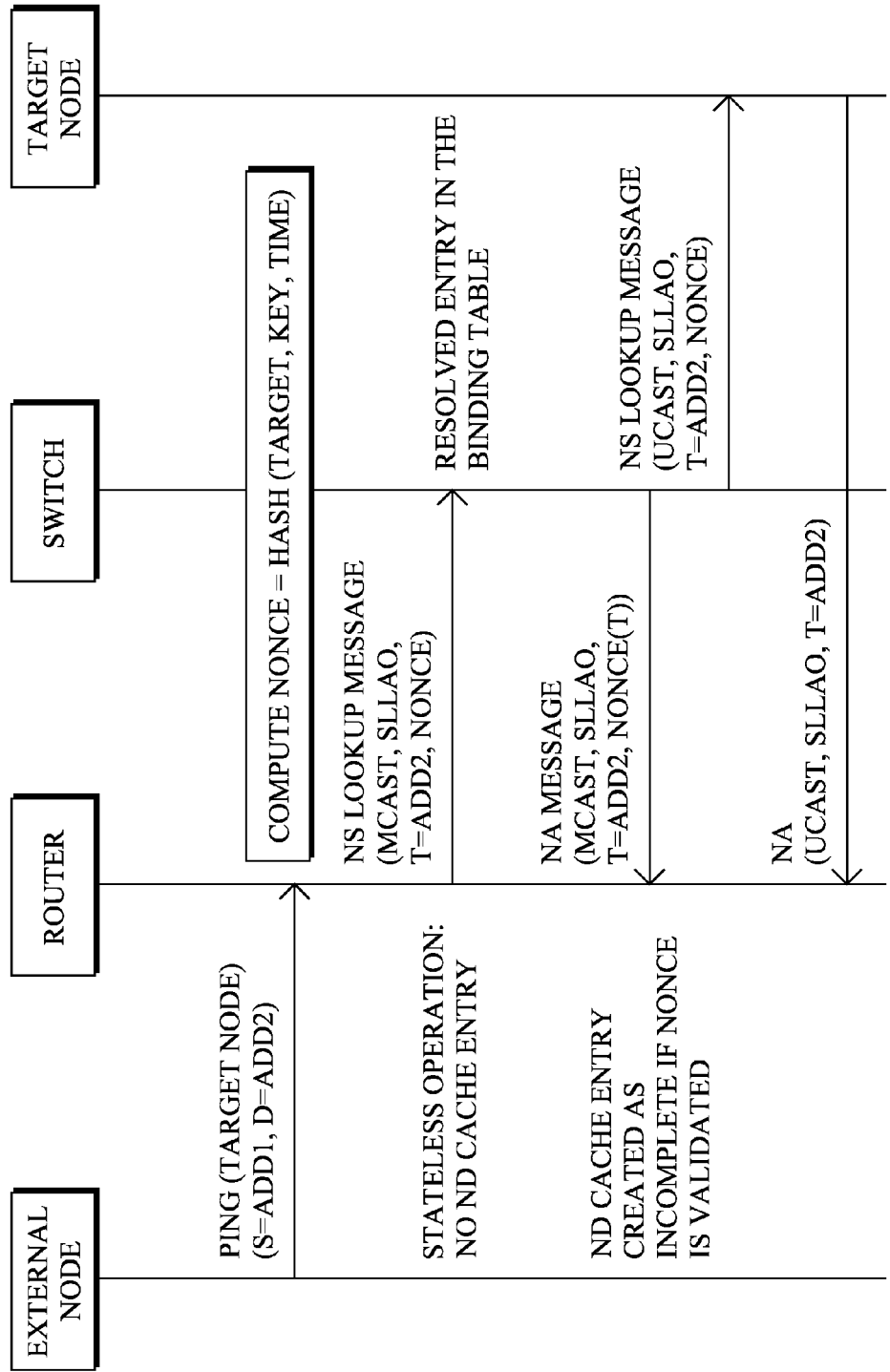
FIGS. 3-5 illustrate example message exchange timing diagrams for neighbor solicitation (NS) lookup flow in a stateless embodiment.
Figure 4:
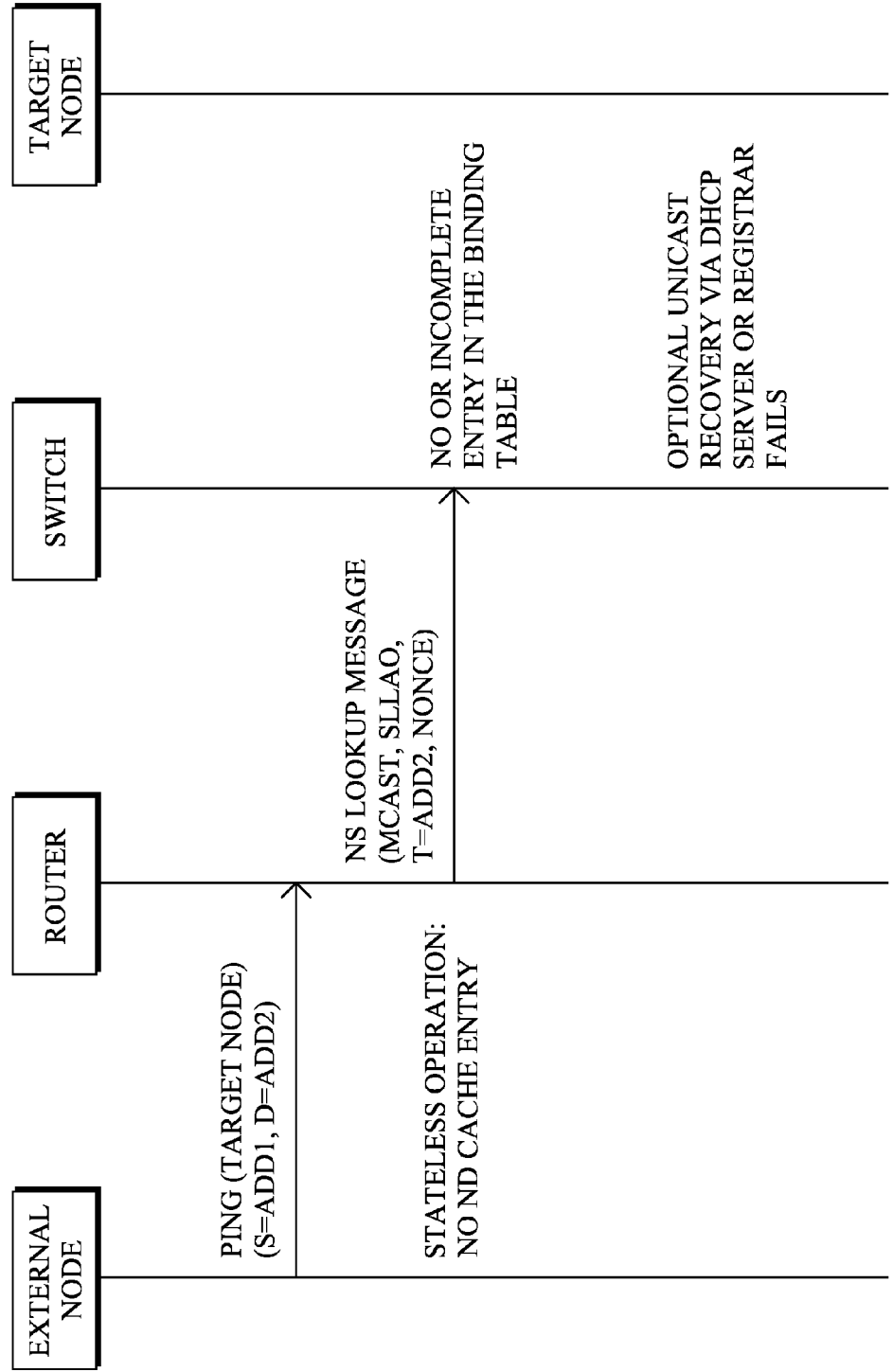
Figure 5:
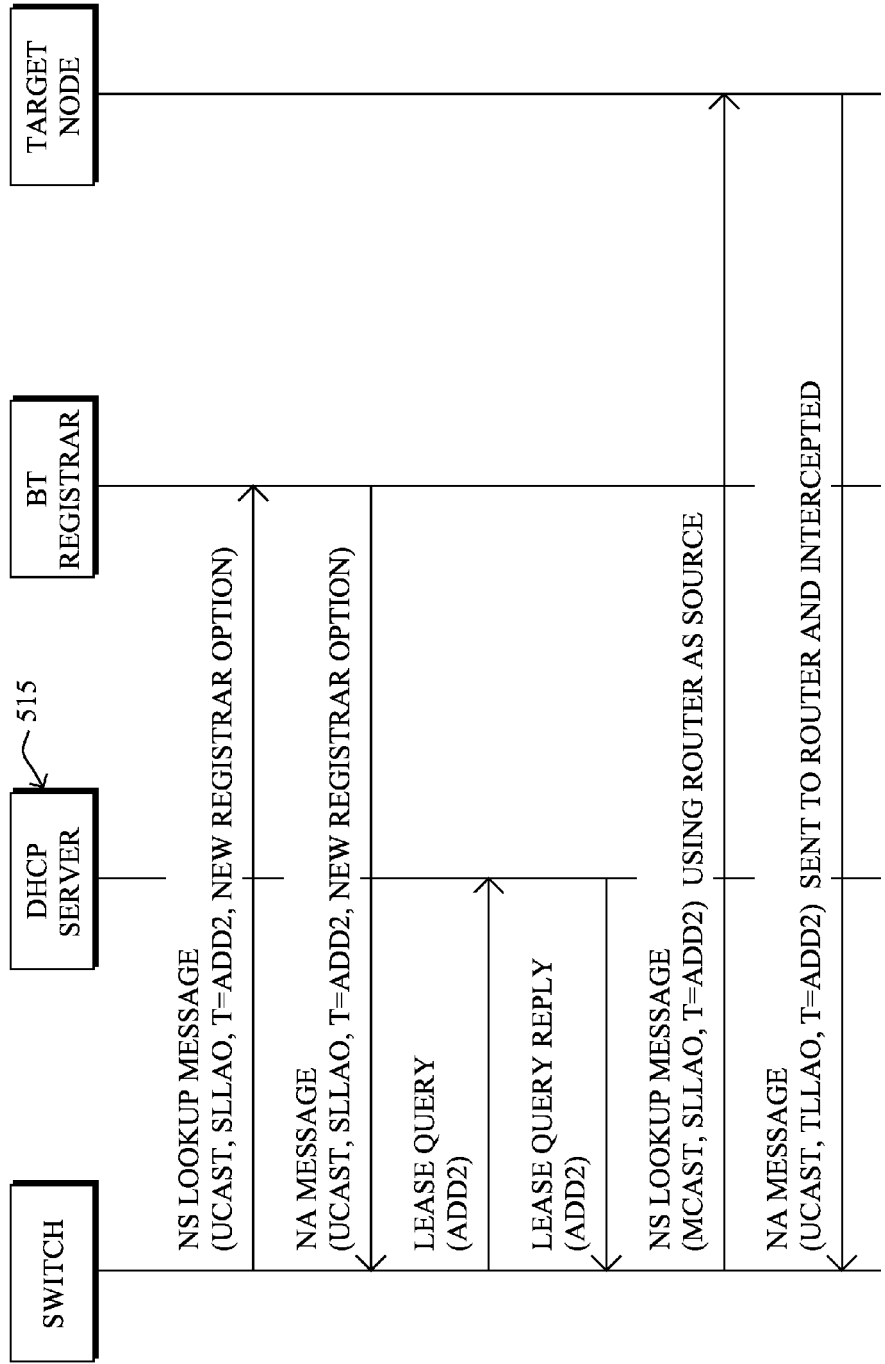

In particular, FIGS. 3-5 illustrate example message exchange timing diagrams for NS lookup flow in a stateless embodiment. FIG. 3, specifically, illustrates a first message to a target node with a binding table "hit" (i.e., the address is within the table and thus within the subnet). First, the external node (source address S="ADD1") pings a particular target node (destination address D="ADD2"), which is received by the router. The router computes the NONCE as a hash of (target, key, time), and, without caching the entry (in the stateless embodiment), multicasts the NS lookup message toward the registry (not shown) with a Source Link Layer Address Option (SLLAO), the target T=ADD2, and the computed Nonce. Upon intercepting the message, the switch may determine a resolved entry in the binding table 247 ("hit"), and returns/multicasts a neighbor advertisement (NA) message to the router with the SLLAO, T=ADD2, and corresponding Nonce(T). The router may then create the ND cache entry (as INCOMPLETE) if the Nonce is validated. Continuing on, the switch may forward (unicast) the NS lookup message to the actual target node (ADD2), which may itself respond to the router with a unicast NA message, accordingly.

Conversely, FIG. 4 illustrates a first message to a target node with a binding table "miss" (i.e., the address is not within the table and thus not within the subnet). First, the external node (S="ADD1") again pings a particular target node (D="ADD2"), which is received by the router. The router again computes the NONCE as a hash of (target, key, time), and multicasts the NS lookup message toward the registry. Upon intercepting the message, the switch may now determine no entry or an INCOMPLETE entry in the binding table 247 ("miss"), and in the stateless embodiment, does nothing, and prevents the cache entry from ever being created at the router.

Note that in response to a binding table miss, an optional recovery may be performed, such according to one of the possible recovery options as shown in FIG. 5. For instance, the switch may revalidate its own binding table entries by unicasting the NS lookup message to the binding table registrar 115 (e.g., using a new registrar option), to receive a returned NA message if the entry does in fact exist. Alternative options include transmitting a lease query to a DHCP server 515 for the target node (ADD2) to determine whether the target node is located within the subnet via the lease query reply message, or else sending the NS lookup message through to the target node (using the router 130 as the source), and intercepting any returned NA message (with target LLAO or "TLLAO"), accordingly.

Figure 6:
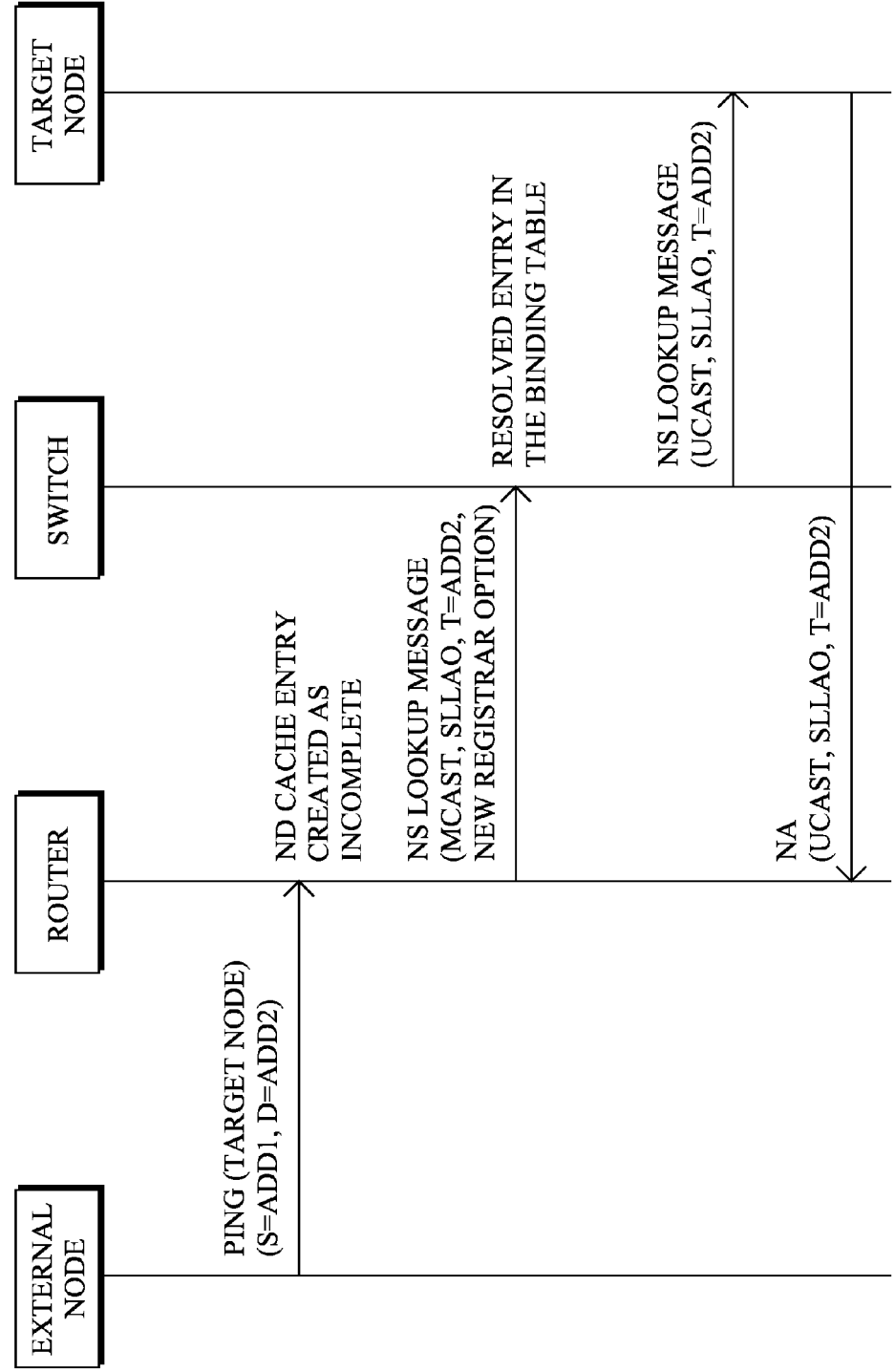
FIGS. 6-7 illustrate example message exchange timing diagrams for NS lookup flow in a stateful embodiment with a registrar option.
Figure 7:
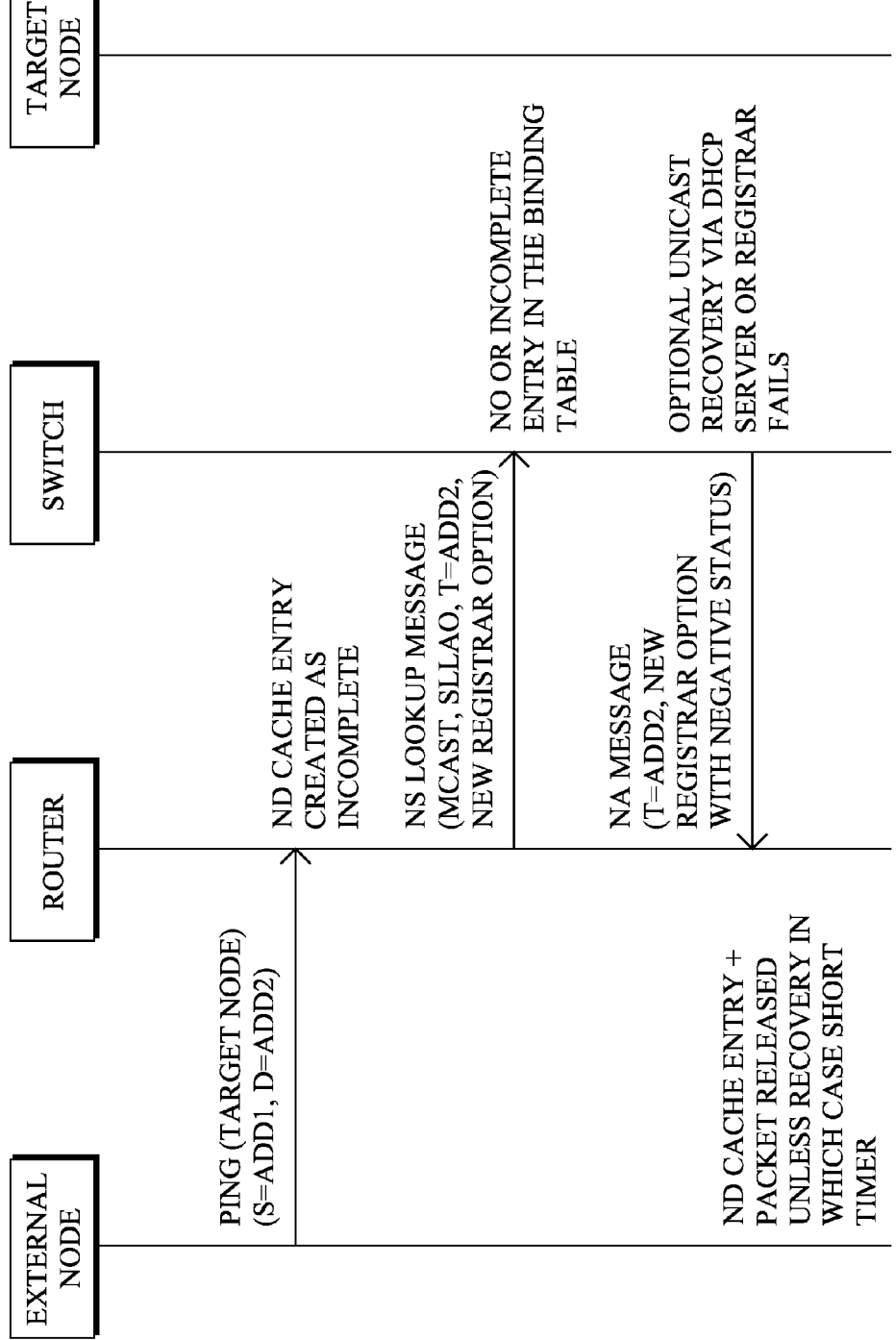

In addition, FIGS. 6-7 illustrate example message exchange timing diagrams for NS lookup flow in a stateful embodiment (with a registrar option). FIG. 6, specifically, illustrates a first message to a target node with a binding table "hit". Here, the external node pings a particular target node, which is again received by the router. In the stateful embodiment, the router creates an INCOMPLETE entry into its ND cache 246 for ADD2, and multicasts the NS lookup message toward the registry (not shown) with an SLLAO, the target T=ADD2, and a new registrar option. Upon intercepting the message, the switch may determine a resolved entry in the binding table 247 ("hit"), and now simply forwards (unicasts) the NS lookup message to the target node (ADD2), which then responds to the router with a unicast NA message, accordingly.

On the other hand, FIG. 7 illustrates a first message to a target node with a binding table "miss". The external node pings a particular target node, and the router again creates a cache entry as INCOMPLETE, and multicasts the NS lookup message toward the registry. Upon intercepting the message, the switch may now determine no entry or an INCOMPLETE entry in the binding table, and returns an NA message to the router indicating the negative status for the target node T=ADD2. In this manner, the router may quickly (e.g., substantially immediately) remove the cache entry, as well as the packet, as described above. Note that recovery is still possible in case the binding table miss was improper, and if so, the packet may be released after a short timer (to allow for possible recovery).

Figure 8:
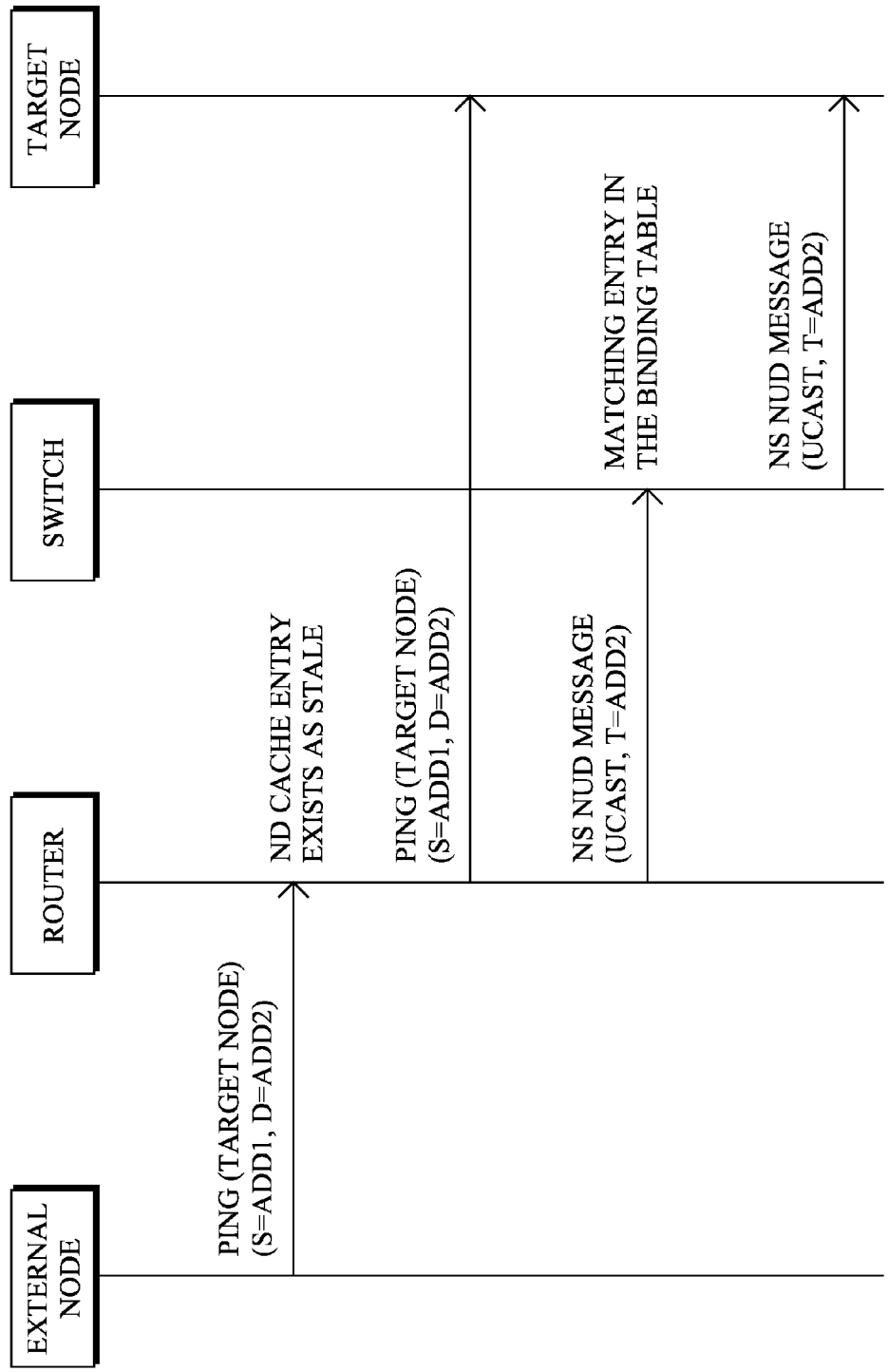
FIGS. 8-10 illustrate example message exchange timing diagrams for neighbor unreachability detection (NUD) lookup flow.
Figure 9:
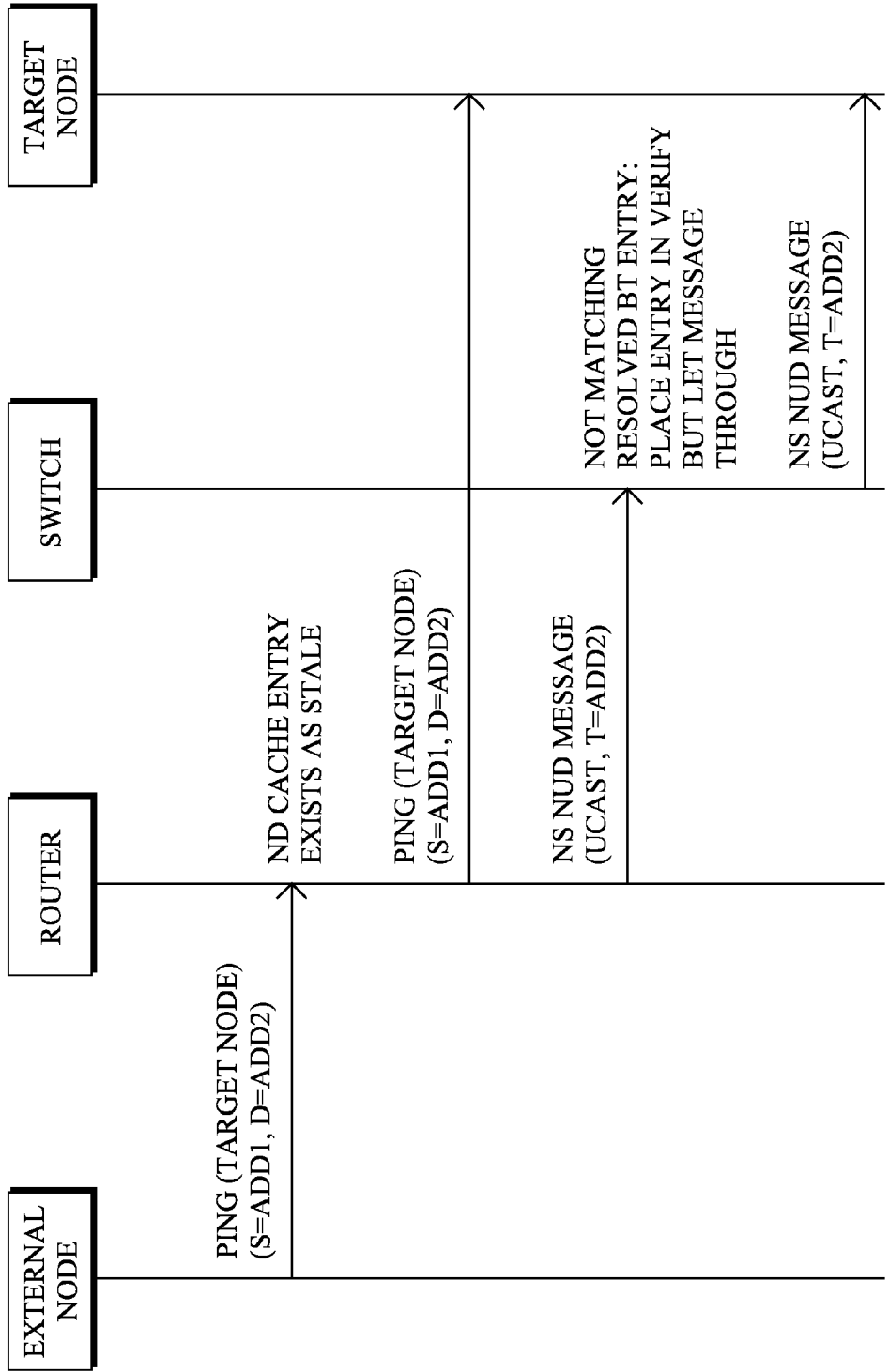
Figure 10:
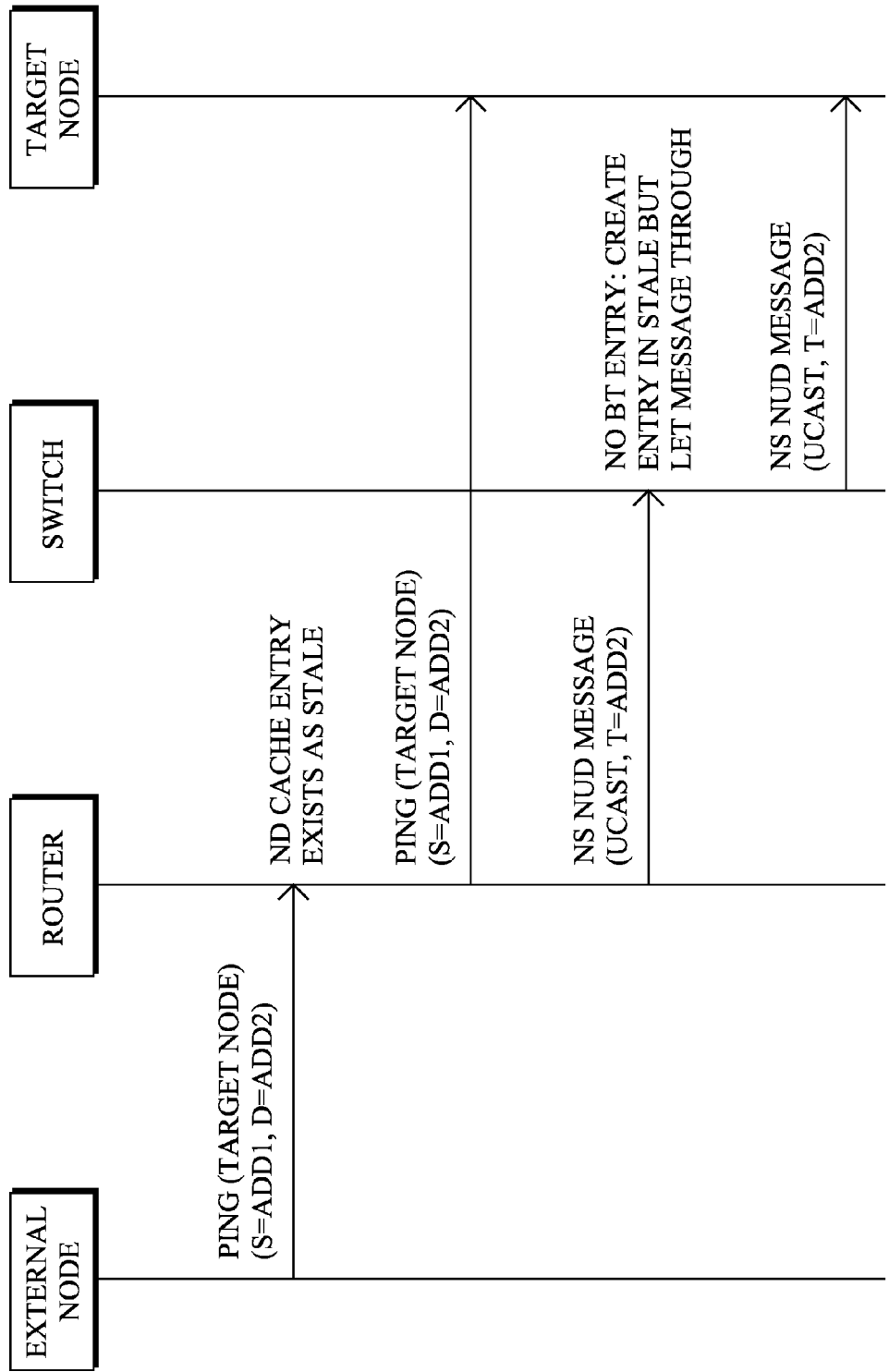

As an illustration of neighbor unreachability detection (NUD) lookup flows, FIGS. 8-10 illustrate further example message exchange timing diagrams. In particular, FIG. 8 illustrates a new message to the target as a binding table hit, where a router receives a ping to a target node (ADD2) that has an existing STALE ND cache entry. As such, the router may ping the target node directly, and if there is no response, then the router may transmit an NS NUD message to the switch 120 for resolution. If there is a matching entry for ADD2 in the switch's binding table, then the switch may also attempt to send an NS NUD message to ADD2 to locate the unreachable node.

Similarly, FIG. 9 illustrates a new message to the target as a binding table mismatch, where a router receives a ping to a target node (ADD2) that has an existing STALE ND cache entry. As such, the router again may ping the target node directly, and if there is no response, then the router may transmit an NS NUD message to the switch for resolution. In FIG. 9, however, if there is not a matching resolved entry for ADD2 in the binding table, then the switch may place the entry in VERIFY state (which may cause the switch to poll the previous location of the address and allow the transfer if the poll times out), and proceeds to verify the nodes binding table state by sending an NS NUD message to ADD2.

Lastly, FIG. 10 illustrates a binding miss. That is, if there is no binding table entry for the target ADD2, then the switch in FIG. 10 may create the entry in STALE state, and may proceed to determine the true reachability state of the target node by sending an NS NUD message to ADD2.

Those skilled in the art will understand that while the message exchanges shown in FIGS. 3-10 have illustrated an example of the techniques described herein in accordance with one or more embodiments described herein, the message exchanges are merely illustrative, and are not meant to limit the scope of the disclosure.

Figure 11:
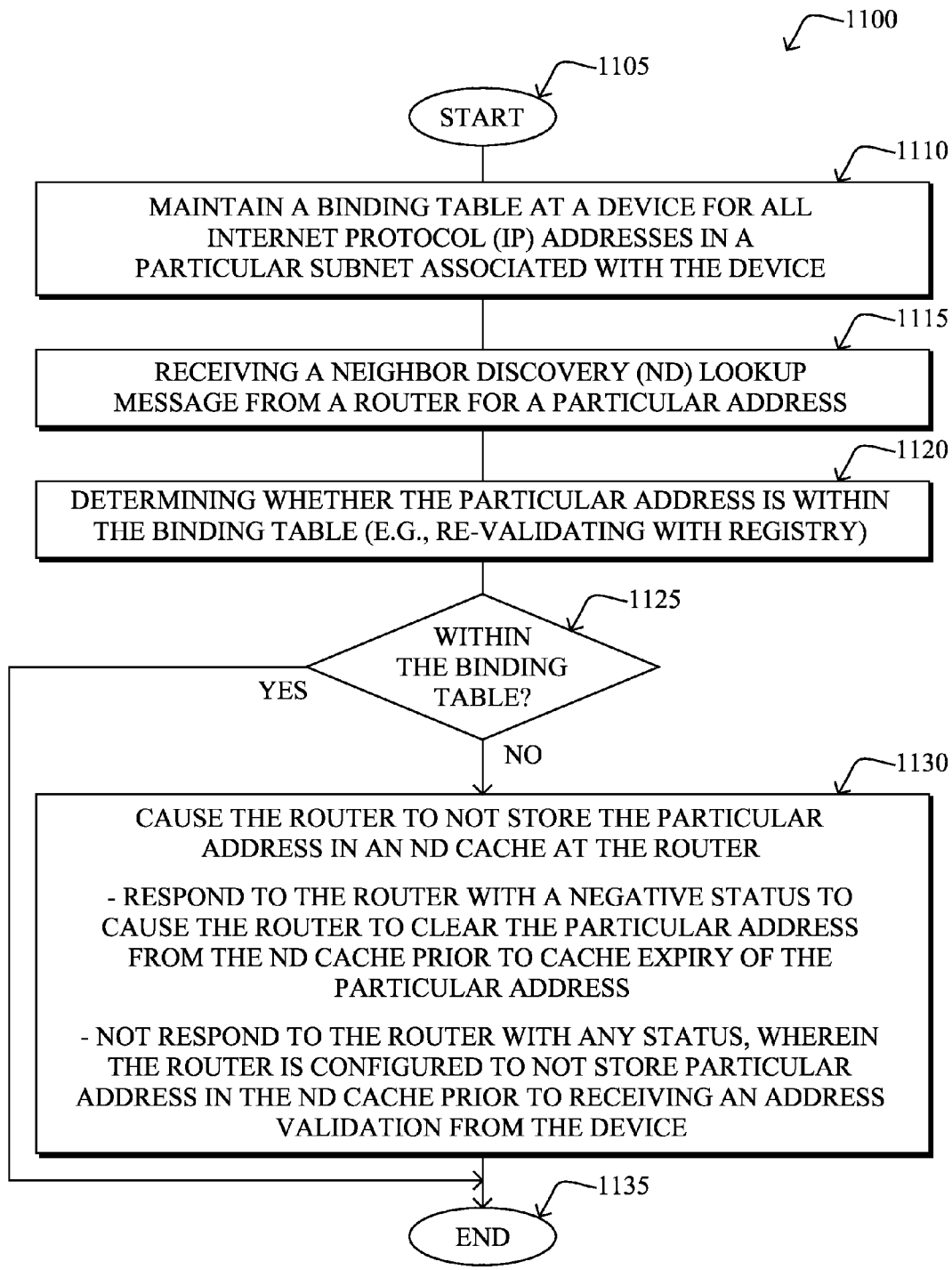
FIG. 11 illustrates an example simplified procedure for protecting an address resolution protocol neighbor discovery (ARP/ND) cache against denial of service (DoS) attacks in a computer network, particularly from the perspective of a switch or registry.

FIG. 11 illustrates an example simplified procedure for protecting the ARP/ND cache against DoS attacks in a computer network in accordance with one or more embodiments described herein, particularly from the perspective of the switch 120 or registry 115. The procedure 1100 may start at step 1105, and continues to step 1110, where, as described in greater detail above, a switch or registry (e.g., device) maintains a binding table 247 for all IP addresses in a particular subnet associated with the device. Upon receiving a neighbor solicitation (NS) lookup message from a router for a particular address in step 1115, the device determines in step 1120 whether the particular address is within the binding table (e.g., re-validating with registry, as noted above). If the entry is not within the binding table in step 1125, then in step 1130 the device causes the router to not store the particular address in a neighbor discovery (ND) cache at the router. In particular, as described above, in one embodiment the device may explicitly respond to the router with a negative status to cause the router to clear the particular address from the ND cache prior to cache expiry of the particular address, while in another embodiment the device may not respond to the router with any status, where the router is configured to not store the particular address in the ND cache prior to receiving an address validation from the device. Note that recovery may be possible after step 1130, such as via a registry, DHCP server, etc., and the capability to get a no response from a registry may be of particular use, as may be appreciated by those skilled in the art. The illustrative procedure may then end in step 1135.

Figure 12:
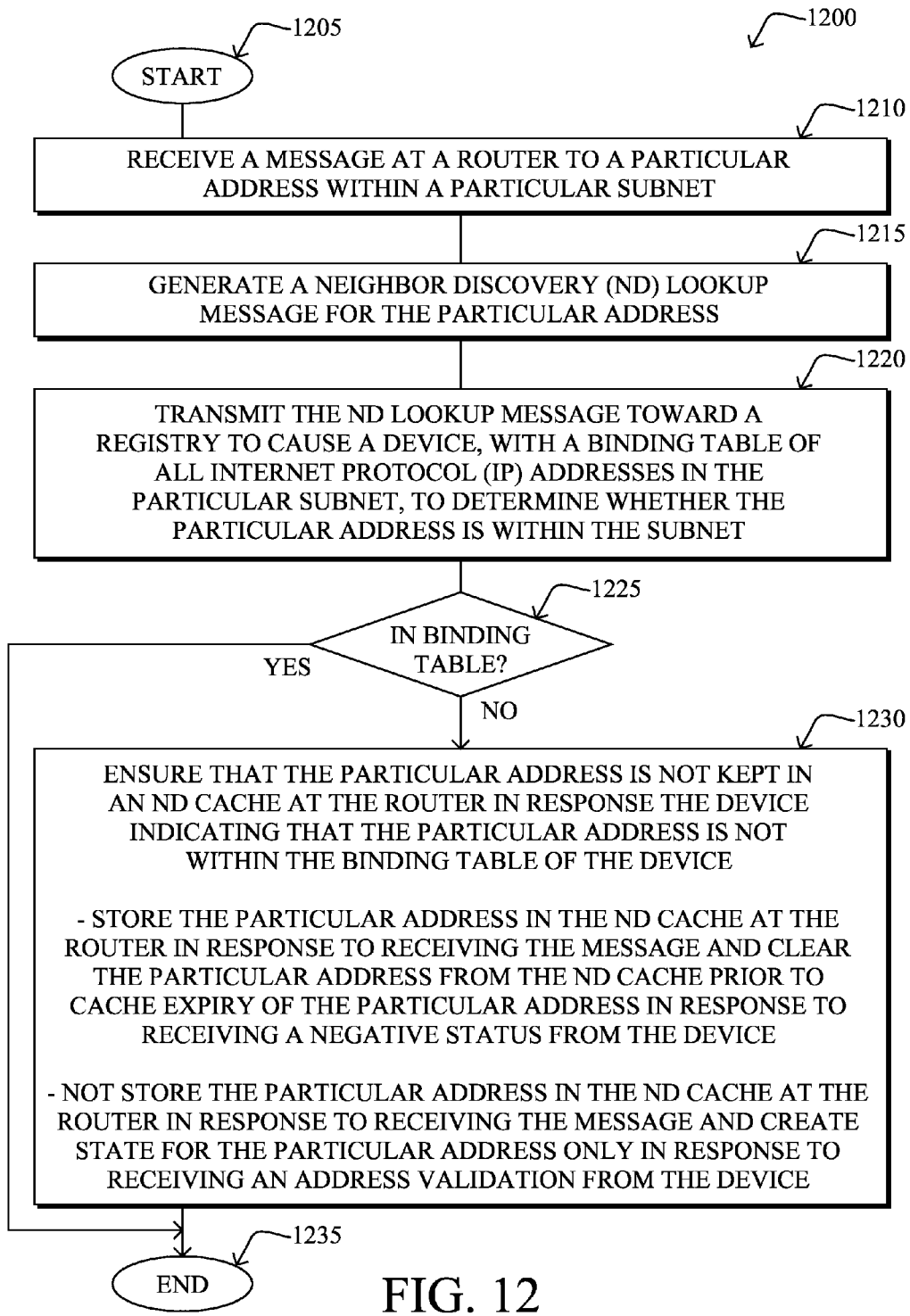
FIG. 12 illustrates an example simplified procedure for protecting the ARP/ND cache against DoS attacks in a computer network, particularly from the perspective of a router.

In addition, FIG. 12 illustrates an example simplified procedure for protecting the ARP/ND cache against DoS attacks in a computer network in accordance with one or more embodiments described herein, particularly from the perspective of the router 130. The procedure 1200 may start at step 1205, and continues to step 1210, where, as described in greater detail above, the router may receive a message from an external node 150 to a particular address within a particular subnet (e.g., from a legitimate external node, or else an attacker). In step 1215 the router may then generate a neighbor solicitation (NS) lookup message for the particular address, and transmits it toward a registry to cause a device (e.g., the registry itself or a switch), with a binding table of all IP addresses in a particular subnet, to determine whether the particular address is within the subnet.

If there is no entry in the binding table in step 1225, and thus in response to the device indicating that the particular address is not within the binding table of the device, then in step 1230 the router ensures that the particular address is not kept in an ND cache 246 at the router. In particular, as described above, the particular address may be stored in the ND cache at the router in response to receiving the message and cleared from the ND cache prior to cache expiry of the particular address in response to receiving a negative status from the device. Alternatively, the router may not store the particular address in the ND cache in response to receiving the message, but instead creates state for the particular address only in response to receiving an address validation from the device. The procedure 1200 my illustrative end in step 1235.

It should be noted that while certain steps within procedures 1100-1200 may be optional as described above, the steps shown in FIGS. 11-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the procedures are not meant to be mutually exclusive.

The techniques described herein, therefore, protect the ARP/ND cache against DoS attacks in a computer network. In particular, the techniques herein add recovery mechanisms for a Binding Table lookup miss in a switch, either via DHCP, an L3 registry, or using a multicast NS (ND) lookup, and defeat external attacks against the ND cache in the router leveraging the first hop security Binding Table in the switches. By making the first hop security Binding Table available to the router, the ND DoS issue is efficiently addressed without requiring any host changes (on target devices 110), and the techniques herein minimize the complexity and dependency between the router and the switch (or registry), in order to maintain the robustness of the resulting solution.

While there have been shown and described illustrative embodiments that protect the ARP/ND cache against DoS attacks in a computer network, it is to be understood that various other adaptations and modifications may be made within the spirit and scope of the embodiments herein. For example, the embodiments have been shown and described herein with relation to a first hop security model. However, the embodiments in their broader sense are not as limited, and may, in fact, be used with other suitable models and/or appropriate standards, including, but not limited to, future versions of the Internet Protocol that utilize similar NS/ND techniques as in IPv6. For instance, the messages used need not be limited to IPv6 ND lookups. In addition, the techniques may also be applied to any node in a very large layer-2 domain to resolve the IPv6/MAC addresses for their peers without sending multicast (e.g., checking a Binding Table or registry in a similar manner).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining a binding table at a device for all internet protocol (IP) addresses in a particular subnet associated with the device;
   receiving a neighbor solicitation (NS) lookup message from a router for a particular address;
   determining whether the particular address is within the binding table; and
   when the particular address is not within the binding table, causing the router to clear the particular address in a neighbor discovery (ND) cache at the router prior to cache expiry of the particular address in the ND cache of the router.

2. The method as in claim 1, wherein causing comprises:
   responding to the router with a negative status to cause the router to clear the particular address from the ND cache prior to cache expiry of the particular address.

3. The method as in claim 1, wherein the device is a registry device.

4. The method as in claim 1, wherein the device is a switch configured to intercept the NS lookup message.

5. The method as in claim 4, further comprising:
   revalidating the particular address with a registry prior to responding to the router on behalf of the registry.

6. A method, comprising:
   receiving a message at a router to a particular address within a particular subnet;
   storing the particular address in a neighbor discovery (ND) cache at the router in response to receiving the message;
   generating a neighbor solicitation (NS) lookup message for the particular address;
   transmitting the NS lookup message toward a registry to cause a device, with a binding table of all internet protocol (IP) addresses in the particular subnet, to determine whether the particular address is within the subset; and
   clearing the particular address from the ND cache prior to cache expiry of the particular address in response to receiving a negative status from the device.

7. The method as in claim 6, wherein the device is a switch.

8. An apparatus, comprising:
   one or more network interfaces to communicate within a computer network;
   a processor coupled to the network interfaces and configured to execute one or more processes; and
   a memory configured to store a process executable by the processor, the process when executed operable to:
      maintain a binding table for all internet protocol (IP) addresses in a particular subnet associated with the apparatus;
      receive a neighbor solicitation (NS) lookup message from a router for a particular address;
      determine whether the particular address is within the binding table; and
      when the particular address is not within the binding table, cause the router to clear the particular address in a neighbor discovery (ND) cache at the router prior to cache expiry of the particular address in the ND cache of the router.

9. The apparatus as in claim 8, wherein the process when executed to cause is further operable to:
   respond to the router with a negative status to cause the router to clear the particular address from the ND cache prior to cache expiry of the particular address.

10. The apparatus as in claim 8, wherein the apparatus is a registry device.

11. The apparatus as in claim 8, wherein the device is a switch configured to intercept the NS lookup message.

12. The apparatus as in claim 8, wherein the process when executed is further operable to:
    revalidate the particular address with a registry prior to responding to the router on behalf of the registry.

13. An apparatus, comprising:
    one or more network interfaces to communicate within a computer network;
    a processor coupled to the network interfaces and configured to execute one or more processes; and
    a memory configured to store a process executable by the processor, the process when executed operable to:
       receive a message for a particular subnet;
       store the particular address in a neighbor discovery (ND) cache at the apparatus in response to receiving the message;
       generate a neighbor solicitation (NS) lookup message for the particular address;
       transmit the NS lookup message toward a registry to cause a device with a binding table of all internet protocol (IP) addresses in the particular subnet to determine whether the particular address is within the subnet; and
       clear the particular address from the ND cache prior to cache expiry of the particular address in response to receiving a negative status from the device.

14. The apparatus as in claim 13, wherein the apparatus is a router, and the device is a switch.

15. The apparatus as in claim 13, wherein the device is a registry device.

16. The apparatus as in claim 13, wherein the device is a switch configured to intercept the NS lookup message.

* * * * *